United States Patent [19]
McLaughlin

[11] 3,805,438
[45] Apr. 23, 1974

[54] DEVICE FOR KEEPING FISHING FLIES AFLOAT

[75] Inventor: James Jay McLaughlin, Kalispell, Mont.

[73] Assignee: The Raymond Lee Organization, Inc., New York, N.Y. ; a part interest

[22] Filed: June 9, 1972

[21] Appl. No.: 261,284

[52] U.S. Cl. .............................................. 43/42.74
[51] Int. Cl. ............................................ A01k 91/00
[58] Field of Search............ 43/42.74, 43.15, 43.16, 43/42.22, 42.35, 42.36, 42.39, 43.14

[56] References Cited
UNITED STATES PATENTS
2,877,594  3/1957  Birrell ............................. 43/42.74
2,961,793  11/1960  Buchanan ......................... 43/42.74
2,792,663  5/1957  Sinclair ............................ 43/43.15

*Primary Examiner*—Louis G. Mancene
*Assistant Examiner*—Gregory E. McNeill
*Attorney, Agent, or Firm*—Daniel Jay Tick

[57] ABSTRACT

A float has a weighted bottom adapted to be affixed to a fishing line. A substantially rigid wire is mounted at the top of the float and extends away from the float. A fishing fly is coupled to the free end of the wire and is adapted to float on a water surface.

5 Claims, 4 Drawing Figures

PATENTED APR 23 1974  3,805,438

DEVICE FOR KEEPING FISHING FLIES AFLOAT

DESCRIPTION OF THE INVENTION

The present invention relates to a device for keeping fishing flies afloat.

The principal object of the invention is to provide a device of simple structure for keeping fishing flies afloat with facility, convenience, efficiency, effectiveness and reliability and which permits simultaneous surface and sub-surface fishing.

In order that the invention may be readily carried into effect, it will now be described with reference to the accompanying drawing, wherein.

In the FIGS., the same components are identified by the same reference numerals.

Figure 1:
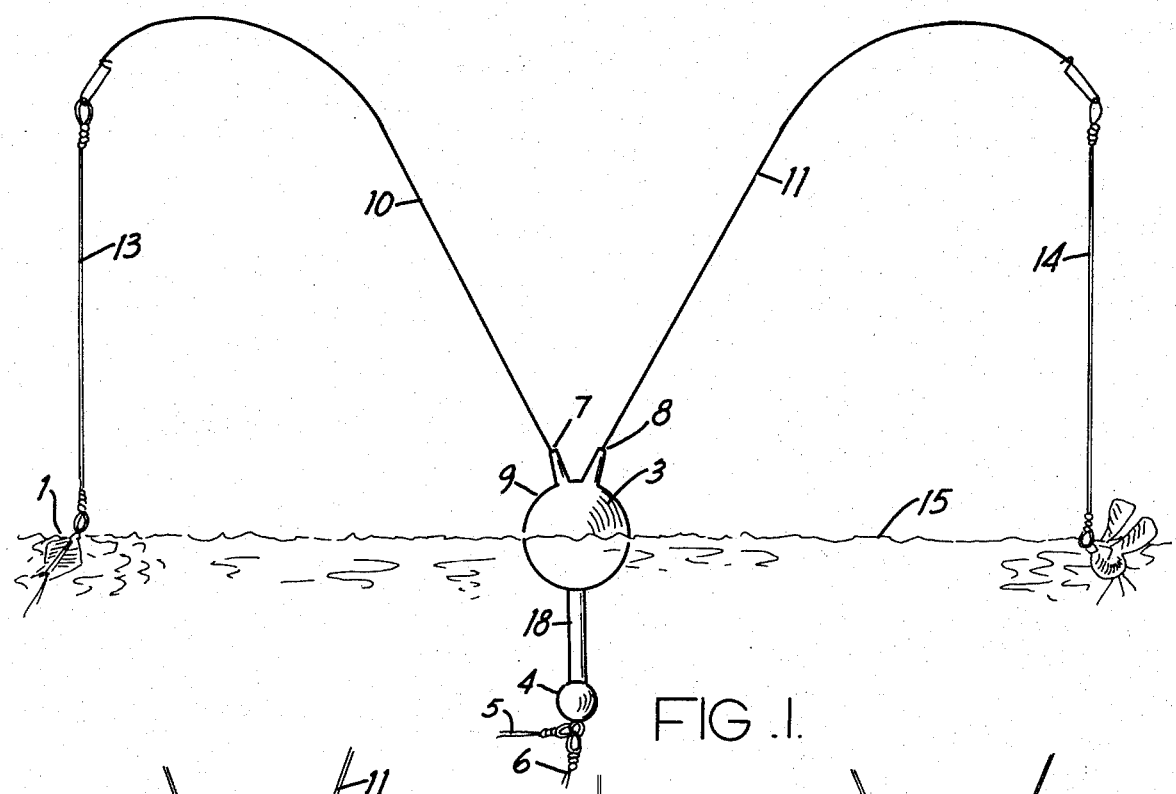
FIG. 1 is a schematic diagram of an embodiment of the device of the invention for keeping fishing flies afloat.
Figure 2:
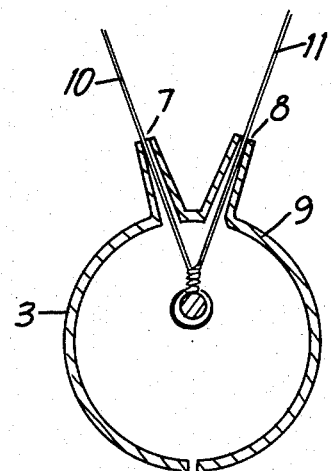
FIG. 2 is a sectional view of the float of the device of FIG. 1.
Figure 3:
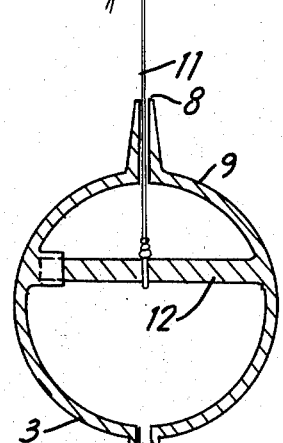
FIG. 3 is a sectional view of the float of the device of FIG. 1 in a plane at right angles to that of the view of FIG. 2.
Figure 4:
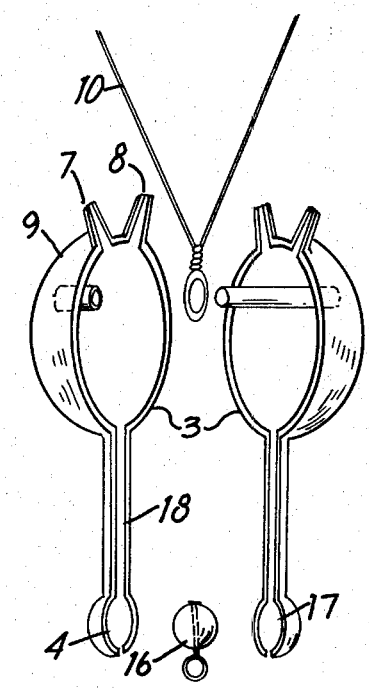
FIG. 4 is an exploded view of the float of the device of FIG. 1.

The device of the invention keeps fishing flies 1 and 2 (FIG. 1) afloat and moving in a lifelike manner. The device of the invention comprises a float 3 having a weighted bottom 4 adapted to be affixed to a fishing line 5 (FIG. 1) or separate leader 6.

The float 3 is hollow and has a pair of openings 7 and 8, and any additional openings of suitable number, at the top 9 thereof. A plurality of substantially rigid wires 10, 11, and so on, such as, for example, piano wires, are affixed to an arm 12 on the inside of the float 3 and extend through the openings 7, 8, and so on. The wires 10, 11 and so on, extend away from the float 3.

The fishing fly 1 is coupled to the free end of the wire 10 via a length of line 13 sufficient to enable said fly to float in a lifelike manner. The fishing fly 2 is coupled to the free end of the wire 11 via a length of line 14 sufficient to enable said fly to float in a lifelike manner on the water surface 15.

The float 3 may be weighted by a lead ball 16 housed in a cup 17 at the bottom of a stem part 18 extending from the bottom of the float.

While the invention has been described by means of specific examples and in specific embodiments, I do not wish to be limited thereto, for obvious modifications will occur to those skilled in the art without departing from the spirit and scope of the invention.

I claim:

1. A device for keeping fishing flies afloat, comprising a float having a weighted bottom adapted to be affixed to a fishing line and a pair of ears at the top extending therefrom at an angle to each other; and a substantially rigid wire mounted in the float and extending away from the float through an ear thereof and having a fishing fly coupled to its free end and adapted to float on a water surface.

2. A device as claimed in claim 1, wherein the fly is coupled to the free end of the wire via a length of line.

3. A device as claimed in claim 1, wherein the float is hollow, has a pair of openings at the top thereof with each of the ears extending from a corresponding one of the openings and the wire is affixed to the float on the inside thereof and extends through one of the openings and the corresponding ear.

4. A device as claimed in claim 1, wherein a plurality of substantially rigid wires are mounted in the float, each extending through a corresponding one of the ears and away from the float and each having a fishing fly coupled to its free end and adapted to float in a water surface.

5. A device as claimed in claim 4, wherein the float is hollow, has a plurality of openings at the top thereof and a plurality of ears each extending from a corresponding one of the openings and the wires are affixed to the float on the inside thereof and extend through the openings and the corresponding ears.

* * * * *